United States Patent [19]

Hodlewsky

[11] Patent Number: 5,020,659
[45] Date of Patent: Jun. 4, 1991

[54] CONVEYOR CHAIN ASSEMBLY

[75] Inventor: William G. Hodlewsky, Greendale, Wis.

[73] Assignee: Rexnord Corporation, Milwaukee, Wis.

[21] Appl. No.: 485,775

[22] Filed: Feb. 21, 1990

Related U.S. Application Data

[63] Continuation of Ser. No. 225,898, Jul. 25, 1988, abandoned, which is a continuation of Ser. No. 38,845, Apr. 15, 1987, abandoned.

[51] Int. Cl.$^5$ .............................................. B65G 17/06
[52] U.S. Cl. .................................................... 198/853
[58] Field of Search ......................... 198/853, 851, 850

[56] References Cited

U.S. PATENT DOCUMENTS

| | | | |
|---|---|---|---|
| 3,602,364 | 8/1971 | Maglio et al. | 198/853 X |
| 3,726,569 | 4/1973 | Maglio et al. | 198/853 X |
| 4,069,911 | 1/1978 | Ray | 198/853 X |
| 4,159,763 | 7/1979 | Kewley et al. | 198/853 |
| 4,438,838 | 3/1984 | Hodlewsky et al. | 198/853 |
| 4,531,631 | 7/1985 | Klefisch | 198/853 |
| 4,556,142 | 12/1985 | Lapeyre | 198/853 X |
| 4,615,343 | 10/1986 | Komossa | 198/853 X |
| 4,688,670 | 8/1987 | Lapeyre | 198/853 |

FOREIGN PATENT DOCUMENTS 3047711 7/1982 Fed. Rep. of Germany .
2130162 5/1984 United Kingdom .

*Primary Examiner*—D. Glenn Dayoan
*Attorney, Agent, or Firm*—Michael, Best & Friedrich

[57] ABSTRACT

The conveyor chain assembly is made of multiple rows of pivotally connected link modules. Each module has spaced link ends which project between the link ends of the module in the adjacent row. The joint between modules in a row is straddled or bridged by a module in the adjacent row to give a bricked lay-up. Each of the modules on the left side of the conveyor has a solid link end so the pivot rod abuts the inside of the link end. The other end of the pivot rod lies just inside of a spring plug mounted in the arm or link end on the right side module. The modules cannot be end-for-ended and assembled. They must be assembled correctly. Certain link ends are wider than the others to require proper assembly to the modules in the adjacent row and to distribute drive loads over a greater area. Both sides of the conveyor are essentially flush or smooth.

9 Claims, 5 Drawing Sheets

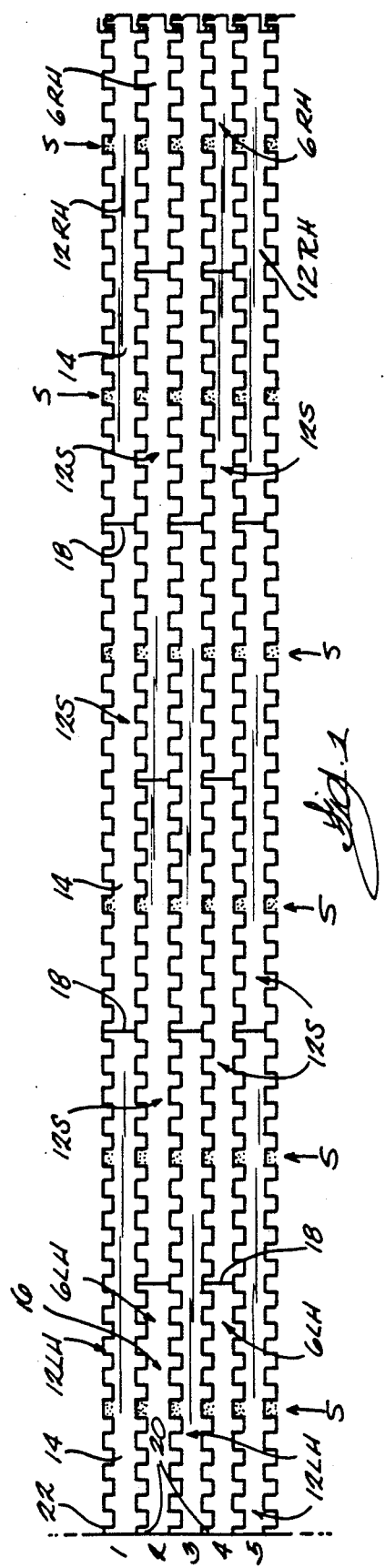
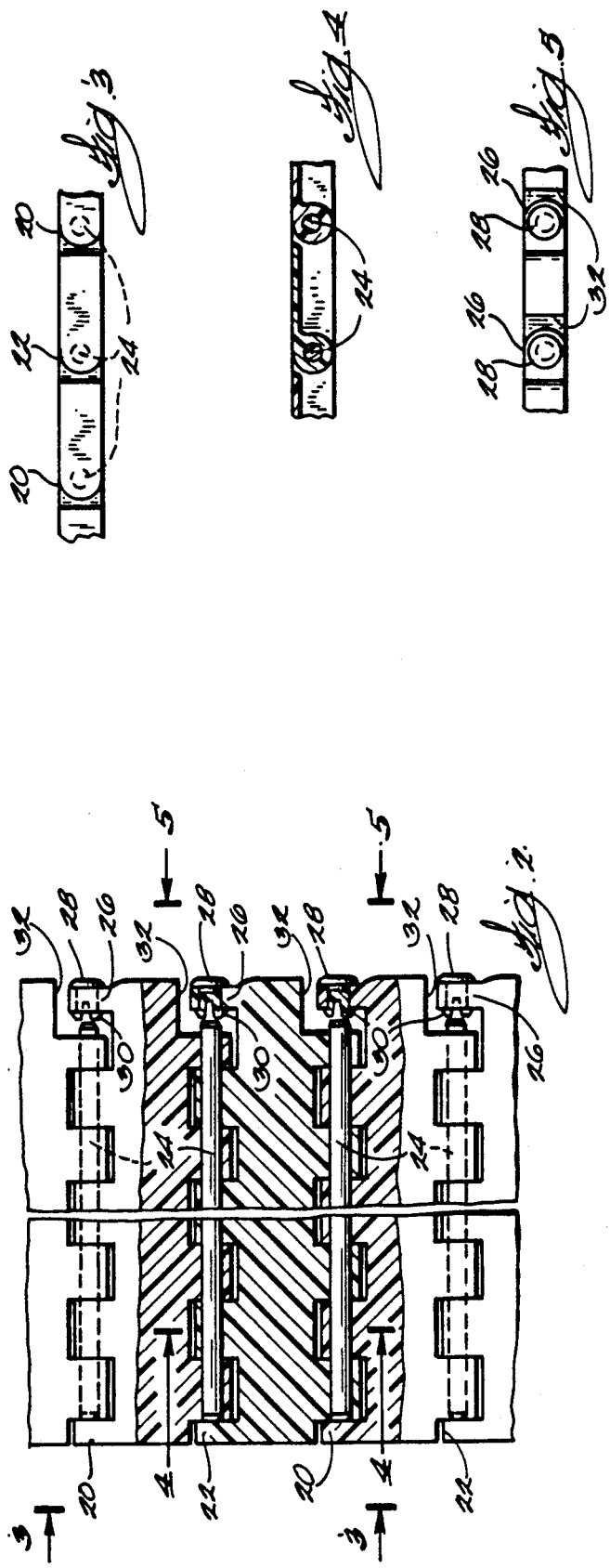

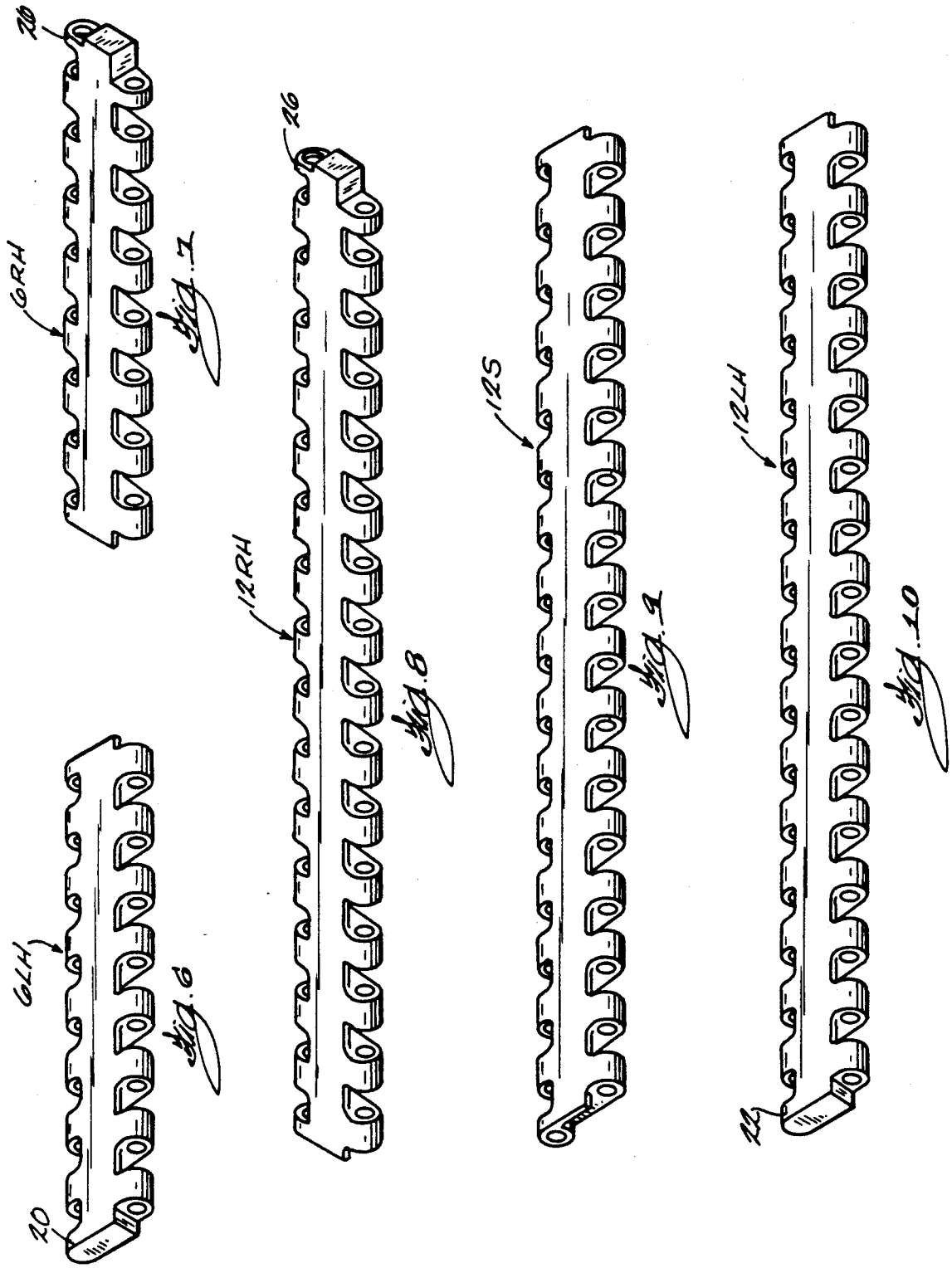

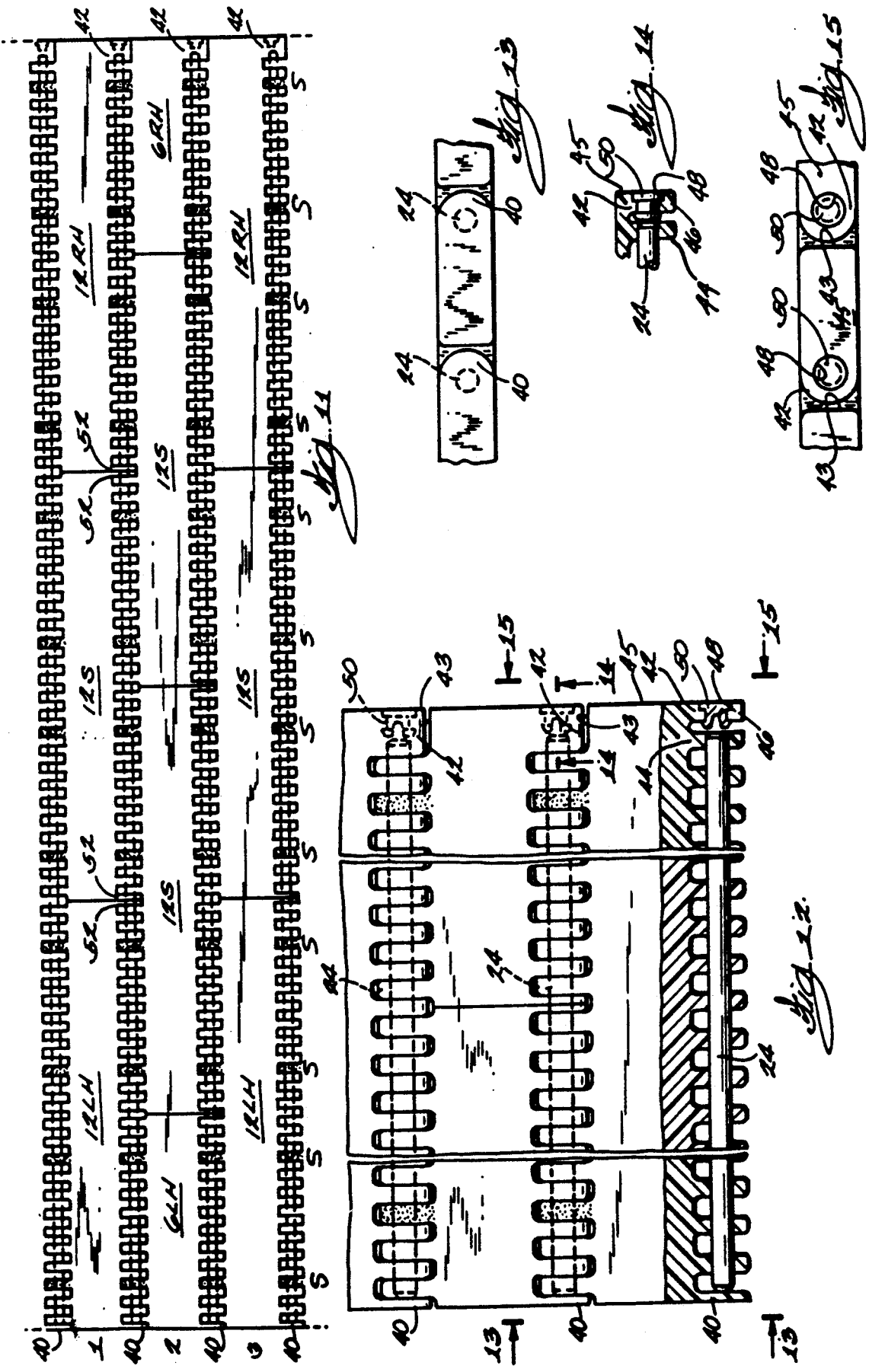

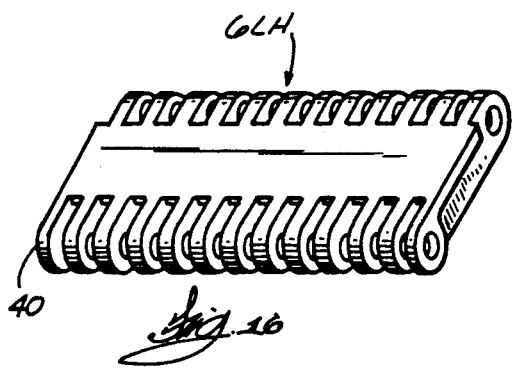
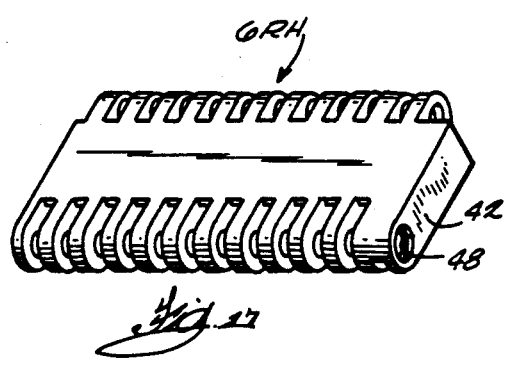
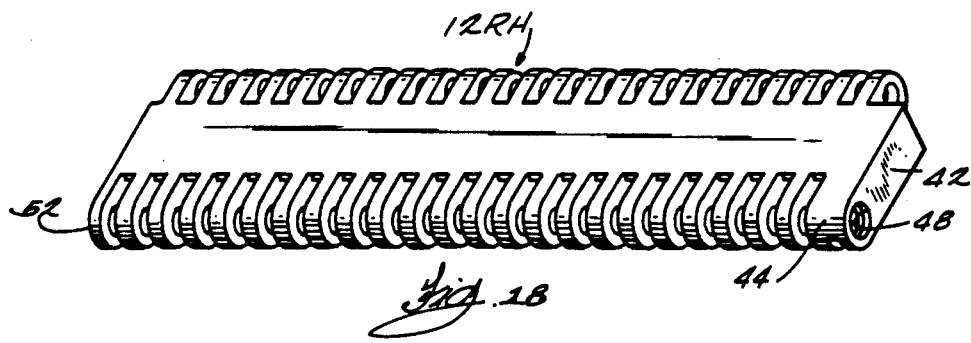
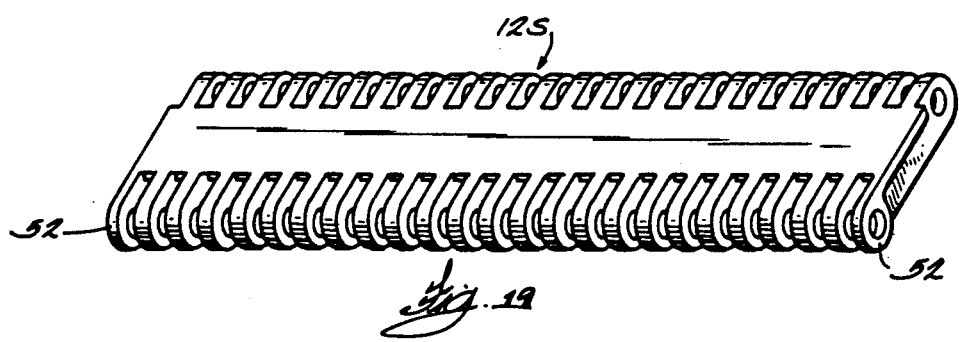
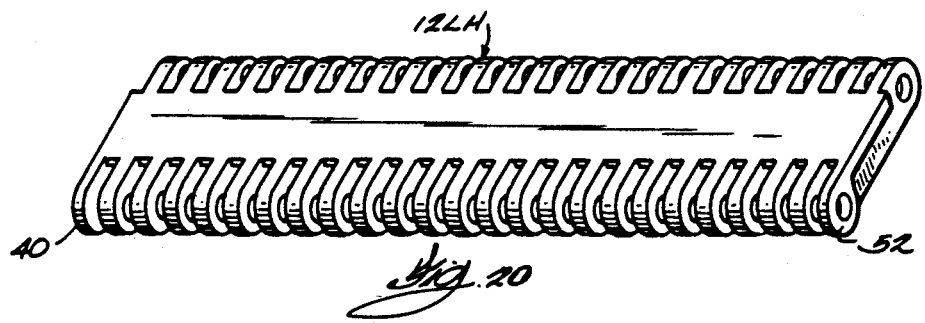

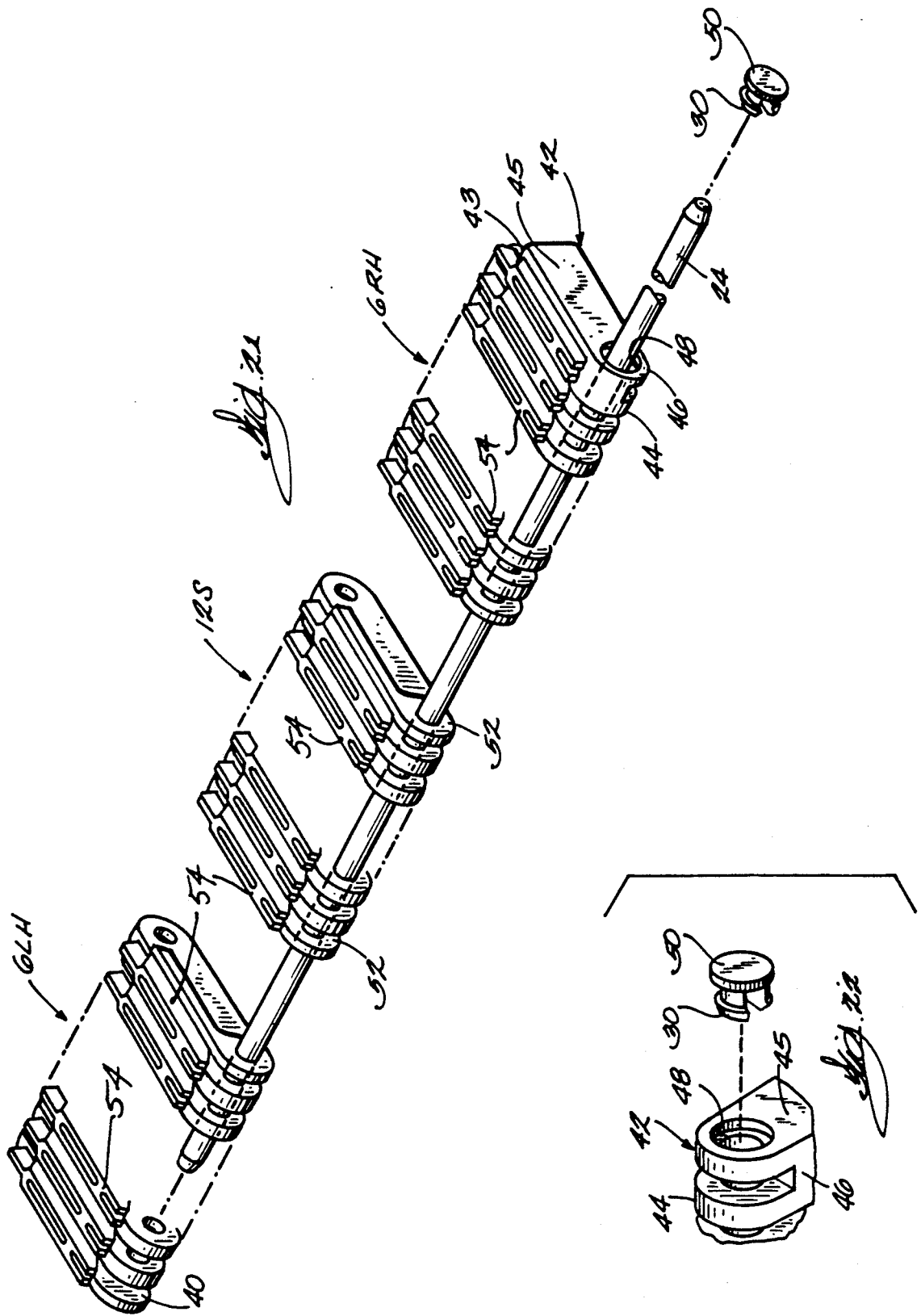

CONVEYOR CHAIN ASSEMBLY

This application is a continuation of Ser. No. 225,898, filed July 25, 1988, now abandoned, and which is in turn a continuation of Ser. No. 038,845, filed Apr. 15, 1987, now abandoned.

FIELD OF THE INVENTION

This invention relates to conveyor assemblies which are made up of a multiplicity of pivotally interconnected rectangular chain modules.

BACKGROUND OF THE INVENTION

Modular conveyor chains have been highly developed over the years. The chain modules making up the conveyor each have a plurality of spaced link ends or eyes which intermesh with the complementary link ends projecting from a module in the adjacent row. A pivot pin runs through the interengaged or meshing link ends to permit pivotal movement of the modules with respect to each other. Typically the pivot pin projects from each edge or side of the conveyor chain and is provided with a head which prevents the pin from moving transversely of the conveyor. The head on one end of the hinge pin can be preformed, but in most cases the heads are formed by heat and pressure after the pin has been placed in position. The heads project to the sides of the conveyor chain and can catch or drag on adjacent structures and require additional lateral clearance between the conveyor and the conveyor guide or between adjacent conveyor chains.

The prior art conveyors generally have modules of similar width engaging one another. This can result in forces being set up tending to separate laterally adjacent modules.

Examples of prior art chains are illustrated in the following U.S. patents:

| Lapeyre, et al. | 3,870,141 | Mar. 11, 1975 |
| Lapeyre | 4,051,949 | Oct. 04, 1977 |
| Lapeyre | Re.30,341 | Jul. 22, 1980 |
| Kewley, et al. | 4,159,763 | Jul. 03, 1979 |

SUMMARY OF THE INVENTION

An object of this invention is to provide a conveyor chain wherein the hinge pins joining the modules can be inserted and held in place without the necessity of forming a head on the pin and thereby reducing the labor and cost required in assembly of the conveyor chain modules.

An object of this invention is to provide a modular conveyor chain in which the modules of the chain are assembled in a "bricked" manner to eliminate the tendency of laterally adjacent modules to separate from one another. This arrangement, coupled with a closed hinge arrangement where the link ends or eyes closely approximate the width of the space in which they fit, results in minimizing the unit loading on the hinge pin and adds to the life of the assembly. The clearance between the meshing link ends is still sufficient to satisfy sanitation requirements by way of allowing flow of cleaning materials between the link ends.

A further object of this invention is to provide a modular conveyor chain having flush sides to enable operation of the conveyor chains in side-by-side relation without wearing down the ends of the hinge pins, and permitting running of these chains side-by-side in the same direction at the same or different speeds or in opposite directions.

Still another object of this invention is to provide a conveyor assembly in which the adjacent chain modules are different one from another in a manner which requires the correct assembly of the conveyor chain modules.

The invention is not limited to the details of construction and the arrangement of components set forth in the following description or illustrated in the drawings The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 1 is a plan view showing a bricked assembly of a conveyor according to this invention.

FIG. 2 is an enlarged horizontal section of a portion of the conveyor shown in FIG. 1. A middle portion not showing anything of great interest has been broken out.

FIG. 3 is an end view taken on line 3—3 in FIG. 2.

FIG. 4 is a section of FIG. 2 taken on line 4—4.

FIG. 5 is an elevation of the right-hand side of FIG. 2 taken as indicated by line 5—5 in FIG. 2.

FIGS. 6–10 are views of the modules used in the first embodiment.

FIG. 6 is a perspective view of a 6" left side module.

FIG. 7 is a perspective of a 6" right side module.

FIG. 8 is a perspective view of a 12" right side module.

FIG. 9 is a perspective view of a 12" standard or middle module.

FIG. 10 is a perspective view of a left side 12" module.

FIG. 11 is a plan view of a second embodiment of the present invention.

FIG. 12 is an enlarged view generally similar to FIG. 2 in concept and shows details of the second embodiment.

FIG. 13 is a view taken on line 13—13 in FIG. 12 and shows an elevation of the left side of the conveyor.

FIG. 14 is a detail taken on line 14—14 to show the plug capturing the pin in the assembly.

FIG. 15 is an elevation taken as indicated by line 15—15 in FIG. 12 and shows the right-hand side of the conveyor.

FIGS. 16–20 are views of the modules used in the second embodiment.

FIG. 16 is a perspective view of a 6" left side module.

FIG. 17 is a perspective view of a 6" right side module.

FIG. 18 is a perspective view of a 12" right side module.

FIG. 19 is a perspective view of a 12" standard or middle module.

FIG. 20 is a perspective view of a left side 12" module.

FIG. 21 is an exploded perspective view of a simplified conveyor 24" wide.

FIG. 22 is an enlarged perspective view of the end of the arm 42 in which the plug is inserted.

DETAILED DESCRIPTION OF THE DRAWINGS

FIG. 1 shows a plan view of a portion of a 36" wide conveyor chain comprised of a plurality of links or chain modules 14 and assembled with the modular components "bricked". Thus, starting at the top of FIG. 1, the first row of chain modules 14 is made up of three 12" wide modules. In this first row, the left-hand edge module 14 is designated a 12LH; that is, a 12" wide module for the left-hand edge of the conveyor. The significance of the edges will become more apparent hereafter. The middle link or chain module is referred to as a 12S, (S for standard), and the right-hand edge module is referred to as a 12RH. The next row of chain modules is made up of a 6" module 16 which is designated a 6LH. Then, to the right is a 12" wide module 14 12S. The next module 14 to the right is also a 12S while the module on the far right of the second row is a 6RH. It will be understood that the 6" module on each end is necessary to separate the joints in a brick-like lay-up. Thus, in the first row there are two joints 18, while in the second row there are three joints.

In the third row, the module arrangement is the same as the first. That is, there is a 12LH a 12S and a 12RH. The fourth row is like the second row, that is a 6LH, two 12S and a 6RH. The fifth row is like rows 1 and 3, i.e., 12LH, 12S and 12RH.

It will be appreciated from the above description that the conveyor chain is made up of five different kinds of chain modules, and these are illustrated more particularly in FIGS. 6, 7, 8, 9 and 10. FIG. 6 shows a module 6LH, while FIG. 7 shows a 6RH module. FIG. 8 illustrates a 12RH module. FIG. 9 shows a 12S module and FIG. 10 shows a 12LH module. Assembling the modules in the bricked arrangement necessitates two different sizes by way of width (width being measured relative to the width of the conveyor chain, not the width of the module). It will be noted that all the left-hand edge modules have a blind link end or eye adjacent the left edge or side of the conveyor chain. Thus, in the 6LH module shown in FIG. 6 the blind link end is designated 20, and in FIG. 10 the blind link end is designated 22. The modules are interconnected by means of a hinge pin or pivot pin 24 inserted from the right-hand side of the conveyor chain and running through the aligned bores or apertures of the meshing or interengaged link ends to abut the blind link end 20 or 22 as the case may be.

It will be noted the pivot pin 24 must pass through the central bore or aperture of a plugged link end or eye 26 at the right edge of module 6RH or 12RH. This plugged link end has a central aperture big enough to easily receive the pivot pin 24 which is cut to length to abut the blind eye 20 on the left side of the 6LH module or the blind eye 22 on the left end of the 12LH module. The right end of the pivot pin 24 will, in all cases, be spaced inwardly of the plugged link end or eye 26. A spring plug 28 is then pressed into the central bore of link end 26. The spring plug includes a head, a shank, and a pair of resilient legs terminating in shoulders. The legs are resilient such that they can be deflected. In the illustrated arrangement the ends of the legs are conical to facilitate insertion of the plug into the aperture in the plugged link end. The spring plug 28 is pressed into the central bore or aperture in the plugged link end 26 until the shoulders of the plug legs are on the inside of the plugged link end and the resilient plug legs spring outwardly to retain the plug in the plugged link eye. With the spring plug housed in the aperture it blocks axial movement of the pin 24 to the right. The left end of the pin 24 is similarly restrained against axial movement by the blind link end 20 or 22.

The fastener arm 26 and spring plug 28 occupy space 32 in the right-hand end of the module in the adjacent row. With this configuration, it will be apparent the right-hand module cannot be reversed end-for-end and assembled into the conveyor. This foolproof assembly concept is carried over to the other modules in the assembly as well. For example, the 6LH module in FIG. 6 and the 12LH module in FIG. 10 are non-reversible. Among other things, the blind link end 20 or 22 would block passage of the pivot pin during assembly of the pivot pin to the conveyor. But over and above that, the link end on the right end of either module would be facing the wrong direction when attempting to make the assembly. The same is true of the 12S and 12LH modules. They can't be reversed end-for-end.

Additionally, the middle link ends of the 6LH or the 6RH module are slightly wider than the other link ends, and the corresponding space between the confronting adjacent link ends of the next module is somewhat wider than the space between the other link ends. For purposes of illustration, these link ends are shown in FIG. 1 as being shaded and the corresponding wider link ends in a properly bricked assembly of the 12" modules are also shown shaded in FIG. 1. It will be noted that the wider link ends all line up as indicated by "S". These (shaded) wide link ends function as keys for proper alignment and assembly of the modules, and if the modules are not properly positioned during assembly, the link ends cannot be meshed. Therefore, workers assembling the conveyor and working from either side can start with a middle module and be assured of a proper alignment. If the modules are not properly aligned they won't fit together. This, coupled with the inability to end-for-end the modules, results in very fast, foolproof assembly still obtaining the benefits of a bricked construction. Additionally, the wide eyes can transmit greater loads, and therefore, the wide eyes can be located in those areas of the modules in alignment with the cavities on the underside of each module where the drive sprockets engage the modules.

Reference has been made to the fact that the bricking, in effect, ties modules in one row together through modules in the adjacent row. For example, the 12LH module in row 1 of FIG. 1 in effect straddles a 6LH module and a 12S module and, therefore, is operative to tie modules 6LH and 12S together. This keeps the entire assembly from drifting apart and keeps the sides of the conveyor smooth.

As can be seen in FIGS. 2 and 3, the left edge of the conveyor chain is essentially flush. A comparison of FIGS. 2 and 5 shows that the spring plug ends also lie in substantially the same plane as the right edge of the RH modules. Therefore, the right edge of the conveyor chain is essentially flush, and there are no projections to engage wear plates or the like. This permits two conveyor chains to run side-by-side at the same speed, different speeds or in opposite directions and with no intermediate guides and without undue friction or snagging between the two conveyors.

While for convenience of illustration the modules are shown as having solid upper surfaces, it will be understood by those skilled in the art that appropriate holes may be provided in the top surface of the modules to provide for passage of liquids or air as is customary in mat top conveyor assemblies, and the modules may also be provided with upwardly projecting ribs, the ribs extending parallel to the direction of movement of the conveyor chain or transverse to the direction of movement. The modules are also usually made of plastic which can withstand the heat and solutions encountered in operation and in cleaning the conveyor.

Turning now to the second embodiment, FIG. 11 shows a portion of a 36" wide conveyor having a first row made up of three 12" modules. The 12" modules are, left to right; 12LH, 12S and 12RH. In the next row, to get the bricking effect, the left edge module is a 6LH module, followed by two 12S modules and a 6RH module. Row 3 repeats row 1 and row 4 would repeat row 2.

Five different modules are incorporated. Each left edge module, 12LH or 6LH, has a blind link or eye 40 against which the hinge pin 24 will abut when the assembly is completed. Referring to modules 6RH and 12RH (FIGS. 17 and 18), it will be noted that the rearwardly facing arm or link end 42 at the right side of each module is substantially wider than any other link end. On the front of the module at the right side, there is a substantial opening 43 to receive the adjacent rearwardly extending link end 42. These modules cannot be reversed end-for-end during assembly of the conveyor chain.

In FIG. 12 it will be noted that the rearwardly extending link end or arm 42 incorporates a more-or-less standard link end 44 on the inside of the link end or arm 42. The pivot pin 24 runs through the link end 44 and the meshing link ends to abut the blind eye 40 at the left side of the conveyor. The outer surface 45 of the enlarged end 42 has a countersunk hole 48 to receive the head of a spring plug 50 which is pressed into the aperture in link end or arm 46. In the illustrated arrangement the spring plug 50 has a configuration substantially the same as plug 26 referred to above. The inner end of the plug 50 lies close to the pivot pin 24 to prevent axial movement of the pin. The head of the plug 50 substantially fills the countersunk hole and lies flush with the outer surface of the enlarged end 42 so as to present a smooth or flush surface minimizing the chance for snagging or contamination.

In FIGS. 11 and 12 the "wide ends" are shaded to indicate the location of the slightly wide ends (again indicated by "S"). The sprocket drive cavities in the underside of each module line up with the wide eyes as with the first embodiment. It will be appreciated that in order to find a "repeat" of the layout a module would have to be 6" out of position to permit assembly of the wide ends into the adjacent modules. The unlike link ends serve a useful purpose in preventing misassembly of the module and thereby speed up assembly of the conveyor chain. The modules can't be interchanged. For example, in row 1 the 12LH and 12S modules each have a half link end 52 projecting into the space between link ends in the 12S module in row 2. If the 12LH module, for example, were to be reversed, that half link end 52 would abut the blind link end 40 projecting from the row ahead of row 1.

In the embodiment of FIG. 21, the modules are provided with raised ribs 54 for supporting various products as well known in the art. The ribs of one module may or may not overlap ribs of the next leading or next trailing module. The separation between the ribs is adequate to permit removal of product from the conveyor by means of a comb-type transfer plate. The usual perforations are incorporated in the surface of the module for liquid drainage and passage of air.

It will be appreciated that the illustrated modules can be assembled to make a bricked 24" wide conveyor. Thus, that version would utilize 6LH, 12S and 6RH modules as in FIG. 21 followed by a 12LH and a 12RH module. The next row would then be a repeat of the first. Eighteen inch and 30" conveyors can also be bricked with these parts. In every assembly, the joints between modules in a given row are always straddled by a single module in the adjacent row (whether forward or back on the conveyor) and the module which straddles the joint acts to hold the modules together horizontally.

I claim:

1. A conveyor chain assembly comprising
   a multiplicity of rows of chain modules, each of said rows of chain modules including a plurality of chain modules, and each chain module having opposite ends and a plurality of link ends projecting forwardly and rearwardly from the module with respect to the direction of movement of the conveyor chain, and at least one of the chain modules of a first one of said rows including link ends intermeshing with opposed link ends of at least two chain modules in the adjacent row,
   a pivot pin passing through the intermeshing link ends between the rows, the pivot pin having opposite ends,
   each of the multiplicity of rows of chain modules having opposite ends, one end of each of the rows being formed by a chain module including a solid link end, the solid link end including a surface portion positioned in opposed facing relation with respect to one end of the pivot pin and adapted to engage the one end of the pivot pin to prevent movement of the pivot pin out of the intermeshing link ends, and the other end of each of the rows of modules being formed by a module having a plugged link end, said plugged link end having a hole therethrough in alignment with said pivot pin, and
   a plug, at least a portion of said plug being housed in said hole in said plugged link end to prevent axial movement of said pivot pin and retain said pivot pin in its operative position, said plug being resiliently engaged in said hole in said plugged link end.

2. A conveyor chain assembly as set forth in claim 1 wherein the link ends of each chain module include a first plurality of link ends and a second plurality of link ends, each of the link ends of the first plurality of link ends having a first width and each of the link ends of the second plurality of link ends having a width greater than said first width.

3. A conveyor chain assembly as set forth in claim 1 wherein the outside of said plug lies essentially in the same plane as the other end of said rows of modules.

4. A conveyor chain assembly as set forth in claim 1 and wherein said hole in said plugged link end is countersunk and wherein said plug includes a head having a generally planar surface, said generally planar surface of said head being flush with said other end of said row of modules.

5. A conveyor chain assembly comprising
   a multiplicity of rows of chain modules defining a conveyor surface, the conveyor surface having opposite edges, each chain module having opposite ends and a plurality of link ends projecting forwardly and rearwardly from the chain module with respect to the direction of movement of the conveyor chain and the link ends of each chain module intermeshing with link ends of the chain modules in the adjacent row, at least one of the chain modules of a first one of said rows including link ends intermeshing with opposed link ends of at least two chain modules in the adjacent row, a pivot pin passing through the intermeshing link ends between the rows, the pivot pin having opposite ends, the multiplicity of rows of chain modules having opposite ends, the chain module forming one end of each row having a solid link end, the solid link end including a surface portion positioned in opposed facing relation with respect to one end of the pivot pin and adapted to engage the one end of the pivot pin to prevent movement of the pivot pin out of the intermeshing link ends, the modules forming the other end of each row each having an end including a plugged link end, said plugged link end having opposite sides and a hole therethrough in alignment with said pivot pin, said plugged link end having a width, and a spring action plug mounted in said hole in said plugged link end to prevent axial movement of said pivot pin and retain said pivot pin in its operative position, said spring action plug including a head portion and a pair of legs projecting from said head portion, said legs having free ends and being resiliently inwardly compressible, and said free ends of said legs including means for engaging a portion of said plugged link end to prevent removal of said plug from said hole.

6. A conveyor chain assembly comprising a multiplicity of rows of chain modules defining a conveyor surface, the conveyor surface having opposite edges, each chain module having opposite ends and a plurality of link ends projecting forwardly and rearwardly from the chain module with respect to the direction of movement of the conveyor chain, and the link ends of each chain module intermeshing with link ends of the chain modules in the adjacent row, a pivot pin passing through the intermeshing link ends between the rows, the pivot pin having opposite ends, the multiplicity of rows of chain modules having opposite ends, the chain module forming one end of each row having a solid link end, the solid link end including a surface portion positioned in opposed facing relation with respect to one end of the pivot pin and adapted to engage the one end of the pivot pin to prevent movement of the pivot pin out of the intermeshing link ends, the modules forming the other end of each row each having an end including a plugged link end, said plugged link end having opposite sides and a hole therethrough in alignment with said pivot pin, said plugged link end having a width, and a spring action plug mounted in said hole in said plugged link end to prevent axial movement of said pivot pin and retain said pivot pin in its operative position, said spring action plug including a head portion and a pair of legs projecting from said head portion, said legs having free ends and being resiliently inwardly compressible, and said free ends of said legs including means for engaging a portion of said plugged link end to prevent removal of said plug from said hole, said plugged link end including a first link portion adjacent to the outside of the module, the first link portion including a hole adapted to house at least a portion of the plug, and a second link portion spaced inwardly from said first link portion, the first and second link portions defining a space therebetween and the second link portion including a central aperture adapted to house the opposite end of said pivot pin.

7. A conveyor link as set forth in claim 6 wherein the spring action plug is housed in said hole in said first link portion with said free ends of said legs in the space between said first and second link portions.

8. A conveyor chain assembly comprising a multiplicity of rows of chain modules, each of said rows of chain modules including a plurality of chain modules, and each chain module having opposite ends and a plurality of link ends projecting forwardly and rearwardly from the module with respect to the direction of movement of the conveyor chain, and at least one of the chain modules of a first one of said rows including link ends intermeshing with opposed link ends of at least two chain modules in the adjacent row, the plurality of link ends including apertures adapted to house a pivot pin, the apertures being aligned to define an elongated bore for housing the pivot pin, a pivot pin passing through the aligned apertures of the intermeshing link ends between the rows, the pivot pin having opposite ends, each of the multiplicity of rows of chain modules having opposite ends, one end of each of the rows being formed by a chain module including a plugged link end, said plugged link end having a hole therein, and a plug, at least a portion of said plug being housed in said hole in said plugged link end and adapted to extend into said elongated bore to prevent axial movement of said pivot pin and retain said pivot pin in its operative position, said plug being resiliently engaged in said hole in said plugged link end.

9. A conveyor chain assembly comprising a multiplicity of rows of chain modules, each of said rows of chain modules including a plurality of chain modules, and each chain module having opposite ends and a plurality of link ends projecting forwardly and rearwardly from the module with respect to the direction of movement of the conveyor chain assembly, and at least one of the chain modules of a first one of said rows including link ends intermeshing with opposed link ends of at least two chain modules in the adjacent row, the plurality of link ends including apertures adapted to house a pivot pin, the apertures being aligned to define an elongated bore for housing the pivot pin, a pivot pin passing through the aligned apertures of the intermeshing link ends between the rows, the pivot pin having opposite ends, each of the multiplicity of rows of chain modules having opposite ends, one end of each of the rows being formed by a chain module including a plugged link end, said plugged link end having a hole therein adapted to house at least a portion of a plug, said plugged link end including a first link portion adjacent to the outside of the module, the first link portion including said hole adapted to house at least a portion of a plug, and a second link portion spaced inwardly from said first link portion, the first and second link portions defining a space therebetween and the second link portion including an aperture adapted to house an end of said pivot pin, and a plug, at least a portion of said plug being housed in said hole in said first link portion to prevent axial movement of said pivot pin and retain said pivot pin in its operative position, said plug being resiliently engaged in said hole in said first link portion.

* * * * *